US008671293B2

(12) United States Patent
Qi et al.

(10) Patent No.: US 8,671,293 B2
(45) Date of Patent: Mar. 11, 2014

(54) MULTI-CORE SYSTEM ENERGY CONSUMPTION OPTIMIZATION

(75) Inventors: Yong Qi, Shanxi (CN); Yuehua Dai, Shanxi (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/878,238

(22) PCT Filed: Sep. 21, 2011

(86) PCT No.: PCT/CN2011/079930

§ 371 (c)(1), (2), (4) Date: Apr. 8, 2013

(87) PCT Pub. No.: WO2013/040762

PCT Pub. Date: Mar. 28, 2013

(65) Prior Publication Data

US 2013/0246781 A1 Sep. 19, 2013

(51) Int. Cl.

| | |
|---|---|
| ***G06F 1/00*** | (2006.01) |
| ***G06F 1/26*** | (2006.01) |
| ***G06F 9/00*** | (2006.01) |
| ***G01R 19/12*** | (2006.01) |
| ***G01R 21/00*** | (2006.01) |
| ***G01R 27/28*** | (2006.01) |
| ***G06F 11/30*** | (2006.01) |
| ***G06F 9/44*** | (2006.01) |
| ***G06F 12/00*** | (2006.01) |
| ***G06F 15/00*** | (2006.01) |
| ***G06F 9/455*** | (2006.01) |
| ***G11C 11/14*** | (2006.01) |

(52) U.S. Cl.

USPC ........... 713/300; 713/320; 713/100; 307/152; 365/227; 702/60; 702/117; 702/186; 703/21; 711/118; 712/28; 712/32; 718/1

(58) Field of Classification Search

USPC ........... 713/300, 320, 100; 307/152; 365/227; 702/60, 117, 186; 703/21; 711/118; 712/28, 32; 718/1

See application file for complete search history.

(56) References Cited

U.S. PATENT DOCUMENTS

| | | | | |
|---|---|---|---|---|
| 7,003,441 | B2 * | 2/2006 | Venkitakrishnan | 703/13 |
| 7,334,143 | B2 * | 2/2008 | Atkinson | 713/320 |

(Continued)

FOREIGN PATENT DOCUMENTS

| | | | |
|---|---|---|---|
| CN | 1678971 | A | 10/2005 |
| CN | 101231552 | A | 7/2008 |
| CN | 101739113 | A | 6/2010 |

OTHER PUBLICATIONS

Shekhar Borkar, “Thousand core Chips-A Technology Perspective”, In Proceedings of the 44th Annual Conference on Design Automation, Jun. 4-8, 2007, pp. 746-749, San Diego, California, USA.

(Continued)

*Primary Examiner* — Stefan Stoynov
(74) *Attorney, Agent, or Firm* — Ren-Sheng International

(57) ABSTRACT

Techniques described herein generally relate to optimizing energy consumption in a computer system. In some examples an energy usage benchmark can be determined for a system component of the computer system by measuring performance levels and energy usages of the system component under a range of energy settings and utilization rates of the system component. A utilization rate of the system component can be determined based on prediction factors including the execution of a first set of instructions on the computer system. The system component can be configured to execute a second set of instructions after the first set of instructions by selecting an energy setting from the range of energy settings for operating the system component. The energy setting can be selected based on the energy usage benchmark and the determined utilization rate.

20 Claims, 6 Drawing Sheets

(56) References Cited

U.S. PATENT DOCUMENTS

| | | | | |
|---|---|---|---|---|
| 7,840,825 | B2 * | 11/2010 | Altevogt et al. | 713/320 |
| 8,397,088 | B1 * | 3/2013 | Ghose | 713/300 |
| 2008/0005599 | A1 | 1/2008 | Theocharous et al. | |
| 2011/0209160 | A1 | 8/2011 | Venkatachalam | |
| 2012/0011378 | A1 * | 1/2012 | Dalton et al. | 713/300 |

OTHER PUBLICATIONS

Michael A. Bell, "Meeting the Data Center Power and Cooling Challenge", Gartner Inc., Dec. 19, 2006, pp. 1-24.

Justine Moore et al., "Making Scheduling "Cool": Temperature-Aware Workload Placement in Data Centers", In Proceedings of the USENIX Annual Technical Conference, Jun. 2005, pp. 61-74.

Parthasarathy Ranganathan et al., "Ensemble-level Power Management for Dense Blade Servers", In Proceedings of the International Symposium on Computer Architecture (ISCA), 2006.

Ben Verghese et al., "Operating System Support for Improving Data Locality on CC-NUMA Compute Servers", In Proceedings of the Seventh International Conference on Architectural Support for Programming Languages and Operating systems, 1996, pp. 279-289.

Venkatesh Pallipadi, "Enhanced Intel SpeedStep Technology and Demand-Based Switching on Linux", Intel Software, May 10, 2010 http://softwarecommunity.intel.com/articles/eng/1611.htm.

Krisztian Flautner et al., "Vertigo: Automatic Performance-Setting for Linux", In Proceedings of the Symposium on Operating Systems Design and Implementation (OSDI), 2002, pp. 105-116.

Canturk Isci et al., "Live, Runtime Phase Monitoring and Prediction on Real Systems with Application to Dynamic Power Management", In Proceedings of the 39th International Symposium on Microarchitecture (MICRO-39), Dec. 2006, pp. 359-370.

Xiaodong Li et al., "Performance Directed Energy Management for Main Memory and Disks", In Proceedings of the ACM Transactions on Storage, Aug. 2005, pp. 346-380, vol. 1, No. 3.

Qingbo Zhu et al., "Hibernator: Helping Disk Arrays Sleep Through the Winter", In Proceedings of the 20th ACM Symposium on Operating Systems Principles (SOSP), Oct. 23-26, 2005, pp. 177-190, Brighton, United Kingdom.

Reinaldo Bergamaschi et al., "Exploring Power Management in Multi-Core Systems", IEEE, 2008, pp. 708-713.

Canturk Isci et al., "An Analysis of Efficient Multi-Core Global Power Management Policies: Maximizing Performance for a Given Power Budget", it was crawled by the Wayback Machine, Jul. 10, 2010 http://parapet.princeton.edu/papers/canturk-micro2006-multicore.pdf.

Notification of Transmittal of the International Search Report and the Written Opinion of the International Searching Authority, Jun. 28, 2012.

Anant Agarwal et al., "The Kill Rule for Multicore", DAC' 07, Jun. 4-8, 2007, 44th ACM/IEEE, pp. 750-753, San Diego, California, USA.

* cited by examiner

210

220

| | <25% Utilization Rate | | 25-50% Utilization Rate | | 50-75% Utilization Rate | | >75% Utilization Rate | |
|---|---|---|---|---|---|---|---|---|
| 33MHZ | 50W | Good | 50W | Fair | 50W | Poor | 60W | Poor |
| 50MHZ | 60W | Good | 60W | Good | 60W | Fair | 65W | Poor |
| 66MHZ | 70W | Good | 70W | Good | 70W | Good | 70W | Fair |

MULTI-CORE SYSTEM ENERGY CONSUMPTION OPTIMIZATION

CROSS-REFERENCE TO RELATED APPLICATIONS

The present application is a 371 application of International Application PCT/CN2011/079930, filed on Sep. 21, 2011 and entitled "MULTI-CORE SYSTEM ENERGY CONSUMPTION OPTIMIZATION." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

Multi-core microprocessor computer systems often offer better performance than single-core microprocessor computer systems. However, multi-core microprocessor computer systems use more energy and create more heat than single-core microprocessor computer systems. As other system components, such as graphics cards and hard drives, improve in performance, they also use more energy and create more heat. Thus, apparatus and method are needed to reduce energy consumption while maintaining performance in a multi-core microprocessor computer system.

SUMMARY

Techniques described herein generally relate to optimizing energy consumption in a computer system. In some examples an energy usage benchmark can be determined for a system component of the computer system by measuring performance levels and energy usages of the system component under a range of energy settings and utilization rates of the system component. A utilization rate of the system component can be determined based on prediction factors including the execution of a first set of instructions on the computer system. The system component can be configured to execute a second set of instructions after the first set of instructions by selecting an energy setting from the range of energy settings for operating the system component. The energy setting can be selected based on the energy usage benchmark and the determined utilization rate.

In one or more embodiments of the present disclosure, methods for optimizing energy consumption in a computer system are described that may include establishing an energy usage benchmark for a system component of the computer system by measuring performance levels and energy usages of the system component under a range of energy settings and utilization rates of the system component. The method may further include determining a utilization rate of the system component based on execution of a first set of instructions on the computer system, and configuring the system component for executing a second set of instructions after the first set of instructions by selecting an energy setting from the range of energy settings for operating the system component. The energy setting may be selected based on the energy usage benchmark and the determined utilization rate. In one or more embodiments of the present disclosure, the method may be implemented using a virtual machine monitor that is configured to host different operating systems on the computer system.

In one or more embodiments of the present disclosure, methods for optimizing energy consumption in a computer system are described that may include determining an instruction load on a CPU of the computer system based on execution of instructions and, when the instruction load on the CPU exceeds a CPU load threshold, determining a cache-miss rate of a cache that is utilized by the CPU during the execution of the instructions. The method may further include lowering the CPU's clock rate when the cache-miss rate is determined to be greater than a cache-miss rate threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings.

DETAILED DESCRIPTION

Figure 1:
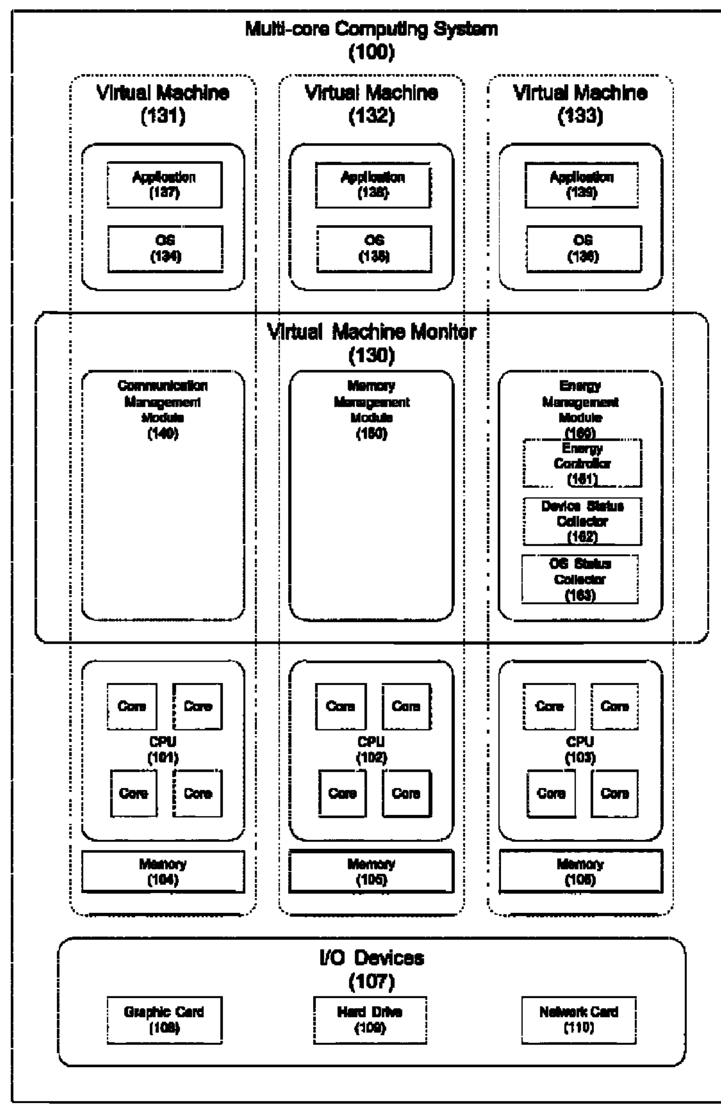
FIG. 1 shows a block diagram of an illustrative multi-core computer system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

This disclosure is drawn, inter alia, to methods, apparatus, computer programs, and systems generally related to optimizing energy consumption in a multi-core computer system.

Some embodiments of the present disclosure generally relate to a hierarchical operating system (OS) architecture for a multi-core computer system. A virtual machine monitor (VMM) may support multiple OSs on the computer system. In one or more embodiments of the present disclosure, the VMM may limit physical resources available to the OSs. For example, the VMM may be configured to run each OS on one central processing unit (CPU) with its own local main memory, and the VMM may assign other system components to the OS that are physically close to the CPU. In one or more embodiments of the present disclosure, the VMM may be adapted to implement a unified model of energy consumption for the CPUs as well as the other system components in the computer system provided to the OSs. The unified model may involve the VMM building an energy usage benchmark for each system component and then adjusting the system component according to operating conditions and the energy usage benchmark.

Throughout the disclosure, the term "energy usage benchmark" may broadly refer to a benchmark represented by energy usages and/or performance levels of a system component associated with its energy settings and/or utilization rates. For example, the energy usage benchmark for a system component may be obtained by operating the system component under various energy settings and utilization rates, and collecting energy usages and/or performance levels of the system component during these operations. Afterwards, the energy usage benchmark may be used to adjust the energy setting of the system component to achieve optimal energy consumption while maintaining acceptable performance.

Throughout the disclosure, the term "energy setting" of a system component may broadly refer to a configuration of the system component that may affect the performance and/or the energy consumption of the system component. The energy setting of the system component may be adjusted by hardware or software means during real-time operations. For example, the clock rate of a CPU may have an energy setting that can be adjusted faster or slower during run time. A CPU configured to run at a faster clock rate may perform better and consume more energy than the same CPU configured to run at a slower clock rate.

In one or more embodiments of the present disclosure, the VMM may be configured to select another system component over a system component originally assigned by an OS to perform one or more scheduled instructions in order to save energy. In some examples, the other system component may be physically closer to the CPU running the OS than the originally assigned system component. In some other examples, the other system component may be physically further from the CPU but is currently idle whereas the originally assigned system component is busy and waiting for it to become available might cost more energy.

In one or more embodiments of the present disclosure, the VMM may be configured to adjust the clock rate of the CPU according to its instruction load and cache-miss rate to save energy. For example, the VMM may be adapted to reduce the clock rate of the CPU when both the instruction load and the cache-miss rate are higher than some threshold level.

FIG. 1 shows a block diagram of an illustrative multi-core computer system 100 arranged according to one or more embodiments of the present disclosure. Computer system 100 may include system components such as CPUs 101, 102, 103, main memories 104, 105, 106, and input/output (I/O) devices 107. One or more of the CPUs 101, 102, and 103 may be multi-core processors. Computer system 100 may have a non-uniform memory architecture so that the main memories 104, 105, and 106 can be local to CPUs 101, 102, and 103, respectively. I/O devices 107 may include one or more graphic cards 108, one or more hard drives 109, and/or one or more network cards 110. Computer system 100 may contain additional system components that are not shown in FIG. 1, such as system buses, optical disk players such as CD ROMs or DVDs, or some other variety of system components. In one or more embodiments, the system components that can be configured under different energy settings may be the subject of a unified model for optimizing energy consumption.

A VMM 130 may be configured to allow the sharing of system components between virtual machines 131, 132, and 133, which may be running their own OSs 134, 135, 136 and applications 137, 138, and 139, respectively. VMM 130 may be adapted to limit the physical resources available to OSs 134, 135, and 136 according to the topology of computer system 100. In one or more embodiments of the present disclosure, VMM 130 can be configured to run each OS on one CPU with its own main memory. For example, VMM 130 can be configured to run OS 134 on CPU 101 with main memory 104, with OS 135 executed by CPU 102 using main memory 105, and with OS 136 executed by CPU 103 using main memory 106. By limiting each OS to one CPU using its own main memory, VMM 130 may save energy otherwise spent on accessing a main memory local to another CPU or a main memory that is shared between the CPUs. In one or more embodiments of the present disclosure, VMM 130 may make available other system components to each OS that are physically close to the CPU assigned to the OS. For example, VMM 130 many present one hard drive 109 that is physically close to the CPU of the OS even though there are multiple hard drives 109 in the computer system 100. By selectively limiting the system components available to each OS, VMM 130 may be adapted to save energy otherwise spent on accessing the system components that are physically distant from the CPU executing the OS.

VMM 130 may include multiple modules configured to manage and support the simulation of physical machines as well as for optimizing the energy consumption of computer system 100. VMM 130 may include one or more of a communication management module 140, a memory management module 150, and/or an energy management module 160. Energy management module 160 may include one or more of an energy controller 161, a device status collector 162, and/or an OS status collector 163.

Communication management module 140 may be adapted to provide access to the various modules of VMM 130 as well as access to the physical system components controlled and managed by VMM 130. communication management module 140 may be adapted to duplicate and synchronize data between one or more of CPUs 101, 102, 103, main memories 104, 105, 106, and/or hard drives 109.

Memory management module 150 may be configured as a uniform interface for accessing main memories 104, 105, and 106 of computer system 100. Memory management module 150 may include facility for memory mapping, access control, and/or buffering for VMM 130.

In one or more embodiments of the present disclosure, energy management module 160 may be adapted to facilitate various energy consumption optimizations in order to increase the energy efficiency of computer system 100 while minimizing the performance degradation. To accomplish this, energy management module 160 may first establish an energy usage benchmark for each system component. During run time, energy management module 160 may be configured to monitor the utilization rate of each system component and adjust the energy setting of the system component based on the energy usage benchmark and the utilization rate.

In one or more embodiments of the present disclosure, the energy usage benchmark for a system component may be established by evaluating the performance levels and the energy usages of the system component during the execution of one or more benchmark programs. The energy usage of the particular system component may be monitored and collected by device status collector 162. Specifically, the system component may include software or hardware for monitoring and collecting the system component's energy usage data. Device status collector 162 may invoke these means periodically or continuously during the execution of the benchmark programs. The collected energy usage data may be represented in a unit of measurement such as watts.

The performance level of a system component executing a benchmark program may be determined based on various factors. In one or more embodiments of the present disclosure, the performance level may be determined by evaluating the time it takes for a system component to execute the instructions of the benchmark program. This execution time may be saved as historical data associated with the energy usage benchmark of the system component. Afterward, threshold values may be set to determine whether the system component had good, fair, or poor performance in terms of execution time. For example, for instructions that may result in a 25-50% utilization rate of a CPU operating at a 50 MHz clock rate, the performance of the CPU may be deemed "Good" when the complete execution time of the instructions is less than a first threshold time period. For instructions that may result in a 50-75% utilization rate of the CPU operating at a 50 MHz clock rate, the performance may be deemed "Fair" when the complete execution time of the instructions is greater than a first threshold time period but less than a second threshold time period. For instructions that may result in greater than a 75% utilization rate of the CPU operating at 50 MHz, the performance may be determined "poor" when the complete execution time of the instructions is greater than the second threshold time period.

In one or more embodiments of the present disclosure, OS status collector 163 may be configured to determine the utilization rate of a particular system component during operation. VMM 130 may be adapted to execute instructions originating from application processes and/or operating system commands. Each of the instructions may have an action and a destination address. Optionally, some of the instructions may also have a corresponding source address. By evaluating the action and the addresses of an instruction, OS status collector 163 may estimate the main purpose of the instruction and the particular system component that may be primarily involved. For example, even though a CPU may be involved in executing an instruction, by evaluating the action and the addresses, OS status collector 163 may be able to determine that the main purpose of the instruction is to access a main memory, access a hard drive, conduct network communication, or render graphical images. As a result, OS status collector 163 may be able to identify the instructions that primarily utilize the system component and determine the utilization rate of the system component as a percentage of the total instructions being executed on computer system 100.

In some embodiments, when an instruction reads or writes to an address that is mapped by an OS to a video card, then OS status collector 163 may determine that the purpose of the instruction is video/graphic processing related. When the purpose of an instruction is not apparent, OS status collector 163 may nevertheless assign an estimated purpose for the instruction. For example, when the instruction multiplies two numbers together, if these two numbers are loaded from the memory, then this instruction may have a memory-access purpose. If these two numbers are loaded from registers, then the instruction may be a purely computational instruction that involves the CPU.

In one or more embodiments of the present disclosure, energy controller 161 may be adapted to adjust the energy settings of each system component. A system component may include hardware or software that adjusts the associated energy settings effectively to control the performance level and energy usage of the system component. For example, the clock rate associated with a CPU and/or a system bus may be effectively increased or decreased, the main memory may be selectively activated or deactivated, the rotational speed of a hard drive may be effectively increased or decreased, and the data transfer rate of a network card may be effectively increased or decreased.

In one or more embodiments of the present disclosure, energy controller 161 may be configured effectively to adjust the energy setting of each system component via communication management module 140. For example, energy controller 161 may be adapted to interact with communication management module 140 to retrieve an energy setting for a system component. Communication management module 140 may be adapted to allow energy controller 161 to configure the system component, including adjusting its energy setting. In one or more embodiments of the present disclosure, device status collector 162 may be configured to collect the energy usage of each system component via communication management module 140.

In one or more embodiments of the present disclosure, energy management module 160 may be configured effectively to collect the performance level and energy usage of each system component after adjusting the system component's energy setting. Energy management module may collect the performance level and energy usage of each system component on a demand basis, on a periodic basis, or on a continuously or substantially continuous basis. The collected performance level and energy usage may be used as feedback to further refine the energy usage benchmark. The details of the above embodiments are further described below.

Figures 2A, 2B:
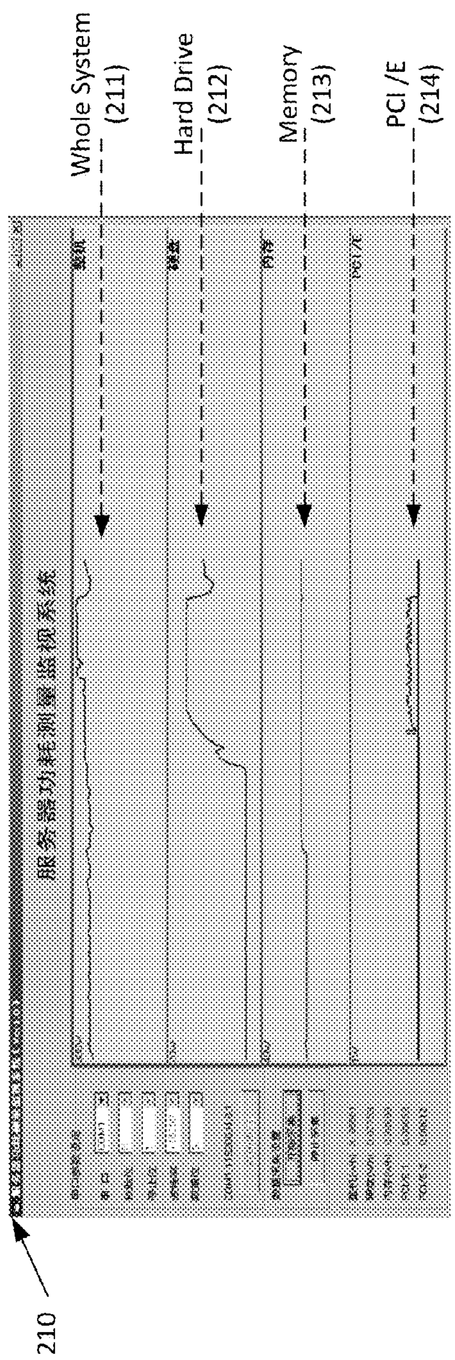
FIG. 2A shows an illustrative chart for monitoring energy usages of various system components.
FIG. 2B shows an illustrative energy usage benchmark.

FIG. 2A shows an illustrative chart 210 for monitoring energy usages of various system components in computer system 100, in accordance with one or more embodiments of the present disclosure. The information captured in chart 210 may be generated by device status collector 162. Chart 210 may include multiple graphs 211, 212, 213 and 213, showing energy usages for the various system components and the whole system over a period of time. For example, graph 211 may show the overall energy usages of computer system 100, graph 212 may show the energy usages of hard drive 109, graph 213 may show the energy usages of main memories 104, 105, 106, and graph 214 may show the energy usages of a PCI/E bus in computer system 100. In one or more embodiments of the present disclosure, if a particular system component does not provide a direct means for collecting its energy usage information, the energy usage for that system component may be derived based on the energy usages of the whole system and the other system components that provide direct means for detecting energy usage information.

In one or more embodiments of the present disclosure, energy management module 160 of VMM 130 may be adapted to determine an energy usage benchmark for a system component based on the observed energy usages of the system component during the execution of one or more benchmark programs. The determined energy usage benchmarks may indicate the performance levels of the system component based on various energy settings and utilization rates. The energy usage benchmarks may be refined based on performance levels and energy usages of the system component observed during run-time.

FIG. 2B shows an illustrative energy usage benchmark 220 for an example computer system, in accordance with one or more embodiments of the present disclosure. Energy usage benchmark 220 may be established by executing one or more benchmark programs with computer system 100. The benchmark programs may be designed to utilize a system component under different utilization rates. Further, the benchmark programs may be configured to collect various performance levels and energy usages from the system component. For example, a certain benchmark program may cause a specific utilization rate (e.g., <25%, 25-50%, 50-75%, or >75%) for a specific CPU. During execution, the benchmark program may set the CPU to a specific energy setting (e.g., CPU clock rate) and collect the energy usage and/or performance level of the CPU based on the specific energy setting and the selected utilization rate. The above benchmarking operation may be repeated with different energy settings and/or utilization rates. The collected energy usages and/or performance values may then be stored along with the corresponding energy settings and the utilization rates in energy usage benchmark 220.

For energy usage benchmark 220, the CPU may be configured to operate in different energy settings (e.g., clock rates 33 MHz, 50 MHz, and 66 MHz) and utilization rates (e.g., <25%, 25-50%, 50-75%, or >75%). Based on these two factors, the benchmark program may collect the energy usages and/or the performance values from the CPU. The collected energy usages and/or the performance levels are then associated with the clock rates and the utilization rates as illustrated.

In one or more embodiments of the present disclosure, during operation, energy management module 160 may be configured to select an energy setting for the CPU based on energy usage benchmark 220 and a utilization rate of the CPU. The utilization rate may be determined based on or more prediction factors including the past execution of a first set of instructions. When the first set of instructions is sufficiently large (e.g., in the order of millions), energy management module 160 may determine the utilization rate of the system component for executing the first set of instructions and use the determined utilization rate as a prediction factor for a utilization rate of the system component for executing a second set of instructions after the first set of instructions.

Some other prediction factors that may be used to determine the CPU utilization rate include the execution time and the CPU temperature collected during the past execution of the first set of instructions. In some situations, the execution time should be the main factor to determine the utilization rate, especially when the CPU is operating under a high performance level. For example, energy management module 160 may determine that when the first set of instructions is finished within a first amount of time, the utilization rate would be 90%. When the first set of instructions is finished above a second amount of time, the utilization rate would be below 70%. In some embodiments, when the CPU is operating in a "fair" performance level, the temperature of the CPU may be used to determine the utilization rate. For example, energy management module 160 may determine that the CPU utilization rate may be 60% when the temperature of the CPU is around 60 degree Celsius, and the CPU utilization rate may be 50% when the temperature of the CPU is below 45 degree Celsius. The CPU utilization rate may be interpolated when the CPU is operating at a degree between 45-60 degrees Celsius.

For example, assuming a first utilization rate for executing the first set of instructions is determined to be 70%, then the first utilization rate may fall in the range of 50-75%. If the current clock rate of the CPU is set to be 66 MHz, energy management module 160 may select 50 MHz as the new clock rate since the energy usage of the CPU at 66 MHz is 70 W while energy usage of the CPU at 50 MHz is 65 W. Further, according to energy usage benchmark 220, the CPU running at 50 MHz may still provide "Fair" performance for executing instructions that have 50-75% utilization rate of the CPU. Thus, by selecting the lower 50 MHz as the new clock rate, the CPU may consume less energy while still providing adequate performance for executing the second set of instructions.

In another example, if the current clock rate of the CPU is set to be 33 MHz, then energy management module 160 may select 50 MHz or higher as the new clock rate since at the current clock rate the CPU may not perform adequately in executing the second set of instructions. After executing the second set of instructions, energy management module 160 may determine a second utilization rate of the system component for executing the second set of instructions and use it as a prediction of a third utilization rate of the system component for executing a third set of instructions after the second set of instruction. Energy management module 160 may then select a new clock rate based on energy usage benchmark 220 and the second utilization rate.

In one or more embodiments of the present disclosure, energy management module 160 may be adapted to further evaluate a cache-miss rate of the CPU for executing a set of instructions when the CPU instruction load is determined to be greater than a threshold value. Based on the evaluation, energy management module 160 may select a lower clock rate if it determines that the CPU may be idle for waiting for cache to be loaded. The details of selecting a clock rate based on CPU instruction load and cache-miss rate are further described below.

Figure 3:
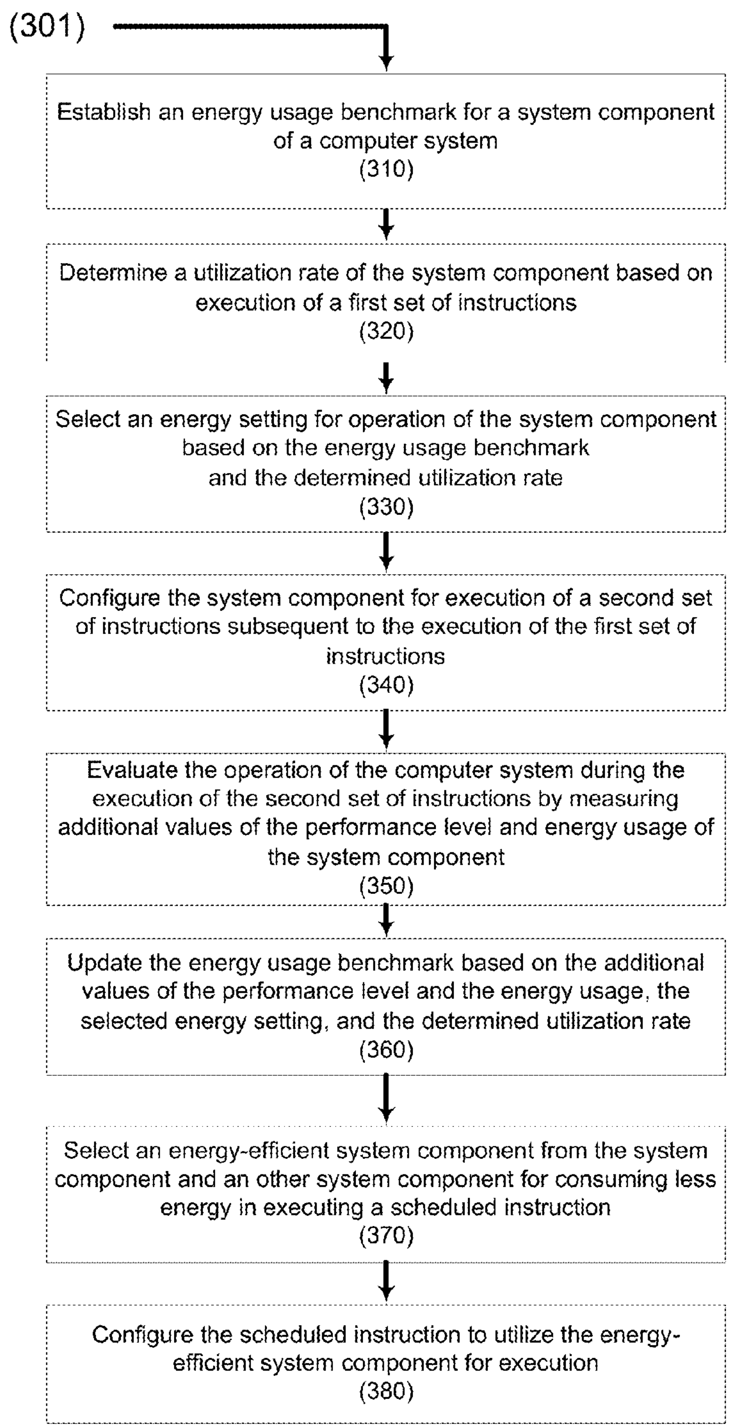
FIG. 3 shows a flowchart of an illustrative method for optimizing energy consumption of a system component in a computer system.

FIG. 3 shows a flowchart of an illustrative method 301 for optimizing energy consumption of a system component in computer system 100 arranged in accordance with one or more embodiments of the present disclosure. Method 301 may be repeated for each system component that is part of the unified model for optimizing energy consumption in computer system 100. Method 301 may include one or more operations, functions, or actions illustrated by one or more of blocks 310, 320, 330, 340, 350, 360, 370, and/or 380. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 301 may begin at block 310.

At block 310, energy management module 160 of VMM 130 running in computer system 100 may be adapted to establish an energy usage benchmark for a system component of the computer system. The energy management module 160 may be configured to establish the energy usage benchmark by measuring performance levels and energy usages of the system component under a set of energy settings and a set of utilization rates of the system component. As described above, energy management module 160 may be configured to run one or more benchmark programs to set the system component to different energy settings and utilization rates, and store the collected performance levels and energy usages in the energy usage benchmark. Block 310 may be followed by block 320

At block 320, energy management module 160 may be configured to determine a utilization rate of the system component based on the execution of a first set of instructions. In some embodiments, energy management module 160 may be adapted to monitor a predetermined number of instructions (e.g., a million instructions) executed on computer system 100 and calculate how many of these instructions primarily utilize the system component. The utilization rate may then be utilized as a prediction factor of the utilization rate of the system component by a second set of instructions after the first set of instructions. Other prediction factors may include execution time and CPU temperature, as described above.

In some embodiments, energy management module 160 may be configured to predict a utilization rate of the system component based on the instructions that are scheduled but not yet executed on computer system 100. VMM 130 may receive a request to execute a specific operation or application. Since the instructions for the specific operation or application may be known beforehand, energy management module 160 may be able to predict the utilization rate, either by relying on historical data or by analyzing the instructions that are loaded into memory before execution.

In some examples, the virtual machine may receive a request to run a word processing application. Since the application may have previously been executed multiple times, energy management module 160 may be able to predict a utilization rate of hard drives 109 based on historical data obtained by monitoring the application's execution. In some examples, the historical data may be stored in an energy usage benchmark for hard drives 109. In some other examples, VMM 130 may also receive a command to open a network communication socket. After the necessary instructions for the command are loaded into memory, energy management module 160 may be adapted to analyze the loaded instructions to predict a utilization rate of the network card before these instructions are executed. In some embodiments, energy management module 160 may determine or predict a utilization rate for each of the system components participating in the energy consumption optimization.

Block 320 may be followed by block 330

At block 330, energy management module 160 may be adapted to select an energy setting for operating the system component based on the energy usage benchmark established at block 310 and the utilization rate determined at block 320. In some embodiments, under the selected energy setting, it may be assumed that the system component meets a threshold performance level for executing a second set of instructions after the first set of instructions. For example, the energy setting may be selected from the energy usage benchmark by evaluating which energy setting is configured to consume the least amount of energy while still performing at or above the threshold performance level for the determined utilization rate. Block 330 may be followed by block 340

At block 340, energy management module 160 may configure the system component for executing the second set of instructions subsequent to the execution of the first set of instructions using on the energy setting selected at block 330. If it is determined that the current energy setting of the system component is different from the newly selected energy setting, energy management module 160 may adjust the system component to the selected energy setting via communication management module 140 of VMM 130. In one or more embodiments of the present disclosure, the system component may be determined to consume less energy under its current energy setting than the newly selected energy setting. However, when energy management module 160 determines that the system component under the current energy setting may not provide adequate performance for executing the second set of instructions, energy management module 160 may nevertheless set the system component to the newly selected energy setting. Such an approach can be utilized to ensure that computer system 100 approximately achieves optimized energy consumption without scarifying the performance of the overall computer system 100. Block 340 may be followed by block 350.

At block 350, energy management module 160 may be configured to evaluate the operation of computer system 100 during the execution of the second set of instructions by measuring additional values of the performance level and the energy usage of the system component. In one or more embodiments of the present disclosure, energy management module 160 may monitor the elapsed time utilized by computer system 100 to complete the execution of the second set of instructions, compare the time with the threshold time period for the energy usage benchmark, and determine the estimated performance level (e.g., poor, fair, good) based on the comparison. The benchmark program may determine the performance level of the system component in executing the second set of instructions. In some embodiments, energy management module 160 may also be adapted to collect real-time energy usage of the system component during the execution of the second set of instructions. Block 350 may be followed by block 360.

At block 360, energy management module 160 may be adapted to update the energy usage benchmark based on one or more of the additional values of the performance level and the energy usage, the selected energy setting, and/or the determined utilization rate. Energy management module 160 may subsequently use the updated energy usage benchmark to approximately optimize for energy consumption of the system component. For example, energy management module 160 may determine another utilization rate of the system component based on the execution of the second set of instructions. Subsequently, energy management module 160 may be adapted to select another energy setting for operation of the system component based on the updated energy usage benchmark and the other utilization rate. Energy management module 160 may then configure the system component with the other energy setting for executing a third set of instructions after the second set of instructions. Similar to block 350, energy management module 160 may be configured to further evaluate the operation of computer system 100 while executing the third set of instructions and further update the energy usage benchmark. As described herein, the energy usage benchmark may be continuously updated based on the feedbacks obtained from the executing of the real-time instructions on computer system 100. Block 360 may be followed by block 370.

In one or more embodiments of the present disclosure, at block 370, energy management module 160 may be configured to select an energy-efficient system component from the system component and another system component for consuming less energy in executing one or more scheduled instructions. Energy management module 160 may evaluate the scheduled instructions to be executed on computer system 100 and determine the system component originally assigned by an OS to perform the scheduled instructions. For example, the OS may issue the scheduled instruction to its CPU and a certain cache without knowing much about the topology of computer system 100.

In one or more embodiments of the present disclosure, energy management module 160 may be configured to evaluate whether the originally assigned system component or an alternative system component is approximately optimal from an energy saving perspective as energy management module 160 is aware of the topology of the system components in computer system 100. In one or more embodiments of the present disclosure, energy management module 160 may be configured to select an alternative component that consumes less energy while meeting a threshold performance level in executing the scheduled instructions in lieu of the originally assigned system component.

In one or more embodiments of the present disclosure, energy management module 160 may be adapted to evaluate the physical distances between the CPU running the OS and the originally assigned and the alternative system components. For example, upon determining the originally assigned cache in the scheduled instructions is located further away from the CPU than an alternative cache, energy management module 160 may select the alternative cache as the energy-efficient system component.

In one or more embodiments of the present disclosure, energy management module 160 may be configured to select an energy-efficient system component based on the availability of the originally assigned system component. For example, upon determining the originally assigned cache is temporarily not available, energy management module 160 may select to use an idle cache that is further away from the CPU because using the idle cache may save energy over waiting for the busy cache. In this example, energy management module 160 may determine that the alternative cache is the energy-efficient system component that should be utilized with the execution of the scheduled instructions. Block 370 may be followed by block 380.

At block 380, energy management module 160 may configure the scheduled instructions to utilize the energy-efficient system component for execution. Further, energy management module 160 may be configured to repeat one or more of the above operations (e.g., blocks 310-380) for other scheduled instructions.

Figure 4:
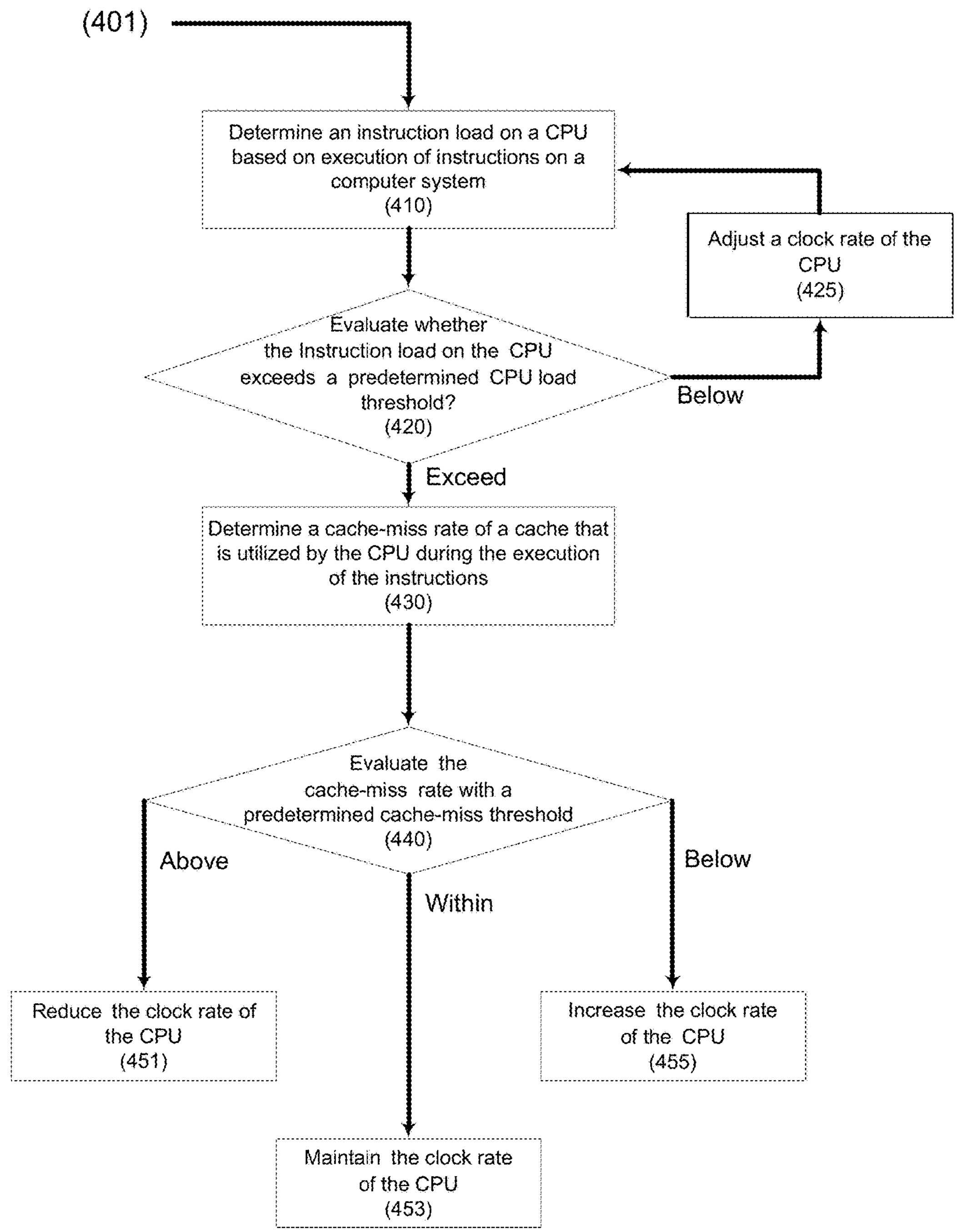
FIG. 4 shows a flowchart of an illustrative method for optimizing energy consumption of a CPU in a computer system based on CPU instruction load and cache-miss.

FIG. 4 shows a flowchart of an illustrative method 401 for optimizing energy consumption of a CPU in computer system 100 based on CPU instruction load and cache-miss rate in accordance with one or more embodiments of the present disclosure. Method 401 may be performed in parallel to method 301 (FIG. 3). Method 401 may include one or more operations, functions, or actions illustrated by one or more of blocks 410, 420, 425, 430, 440, 451, 453, and/or 455. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Method 401 may begin at block 410.

At block 410, energy management module 160 of VMM 130 running on computer system 100 may be configured to determine an instruction load on a CPU based on execution of instructions on computer system 100. In some embodiments, energy management module 160 may be adapted to evaluate one of the cores in a multi-core CPU to determine the instruction load associated with the core. During operation, energy management module 160 may be configured to evaluate a predetermined number of instructions executing on computer system 100 (executing instructions) and count a number of instructions that utilize the particular CPU or a particular core of a multi-core CPU (utilizing instructions). The executing instructions and the utilization instructions may be used to calculate the instruction load for the CPU. For example, the instruction load may be determined by dividing the number of the utilizing instructions by the number of the executing instructions. Block 410 may be followed by block 420.

At block 420, energy management module 160 may be configured to evaluate whether the instruction load on the CPU exceeds a predetermined CPU load threshold. In some embodiments, the predetermined CPU load threshold may be a value (e.g., about 75%) or a range (e.g., from about 50% to about 70%). The predetermined CPU load threshold may indicate the CPU is under a heavy load when the instruction load is above the predetermined CPU load threshold or threshold range, or under a light load when the instruction load is below the threshold or threshold range.

In one or more embodiments of the present disclosure, if the determination at block 420 indicates that the instruction load is below the predetermined CPU load threshold, then block 420 may be followed by block 425. Otherwise, block 420 may be followed by block 430 when the determination at block 420 indicates that the instruction load does not exceed the predetermined CPU load threshold.

At block 425, energy management module 160 may be configured to adjust the clock rate of the CPU based on the CPU's existing clock rate and the determined instruction load. If the instruction load indicates that the CPU is under a fight load and the CPU's existing clock rate is set to high, then the energy management module 160 may adjust the CPU to a lower clock rate. Block 425 may be followed by block 410.

At block 430, energy management module 160 may be configured to determine a cache-miss rate of a cache that is utilized by the CPU during the execution of the instructions. In other words, energy management module 160 may be adapted to evaluate the performance of the cache when the CPU is under a heavy load. A high cache-miss rate may indicate that the data required for the instructions to be executed are not directly accessible and need to be uploaded from the main memory or the hard drives. The uploading of the necessary data may take some time. The CPU may have to wait until the data is uploaded and becomes available even though there are instructions to be executed. Thus, even though the CPU may be under a heavy load, the cache-miss rate may indicate that the CPU is idle and wasting energy. Block 430 may be followed by block 440.

In some embodiments, at block 440, energy management module 160 may be adapted to evaluate the cache-miss rate with a predetermined cache-miss threshold. The cache-miss threshold may be a predetermined value range (e.g., 100-1000). Upon a determination that the cache-miss rate is above the cache-miss threshold, block 440 may be followed by block 451. If the cache-miss rate is determined to be within the range of the cache-miss threshold, then block 440 may be followed by block 453. If the cache-miss rate is determined to be below the cache-miss threshold, then block 440 may be followed by block 455.

At block 451, energy management module 160 may be configured to reduce the clock rate of the CPU since the cache-miss rate is higher than the cache-miss threshold despite the CPU being deemed to be under a heavy load. The amount of adjustment may be determined based on the instruction load on the CPU and/or the cache-miss rate. In one or more embodiments of the present disclosure, energy management module 160 may be adapted to utilize an energy usage benchmark to evaluate how to lower the CPU's energy consumption while still allowing the CPU to provide adequate performance. If the current clock rate of the CPU is low or cannot be adjusted lower, then energy management module 160 may maintain the clock rate of the CPU. At block 453, energy management module 160 may maintain the clock rate of the CPU since the cache-miss rate is within the cache-miss threshold.

At block 455, energy management module 160 may be configured to increase the clock rate of the CPU. If the current clock rate of the CPU cannot be adjusted higher, energy management module 160 may determine to maintain the clock rate of the CPU.

Figure 5:
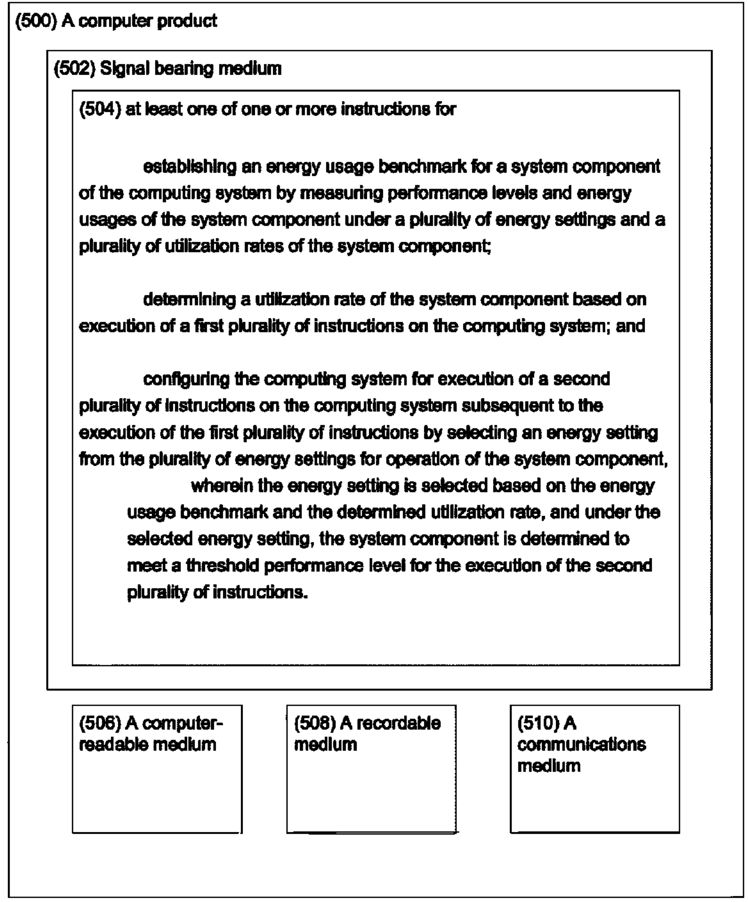
FIG. 5 shows an illustrative computer program product for implementing a method for optimizing energy consumption.

FIG. 5 is a block diagram of an illustrative embodiment of a computer program product 500 for implementing a method for optimizing energy consumption in accordance with one or more embodiments of the present disclosure. Computer program product 500 may include a signal bearing medium 502. Signal bearing medium 502 may include one or more sets of executable instructions 504 that, when executed by, for example, a processor, may be adapted to provide the functionality described above. Thus, for example, referring to computer system 100 of FIG. 1, energy management module 160 may undertake one or more of the operations shown in at least FIG. 3 or FIG. 4 in response to instructions 504 conveyed by signal bearing medium 502.

In some implementations, signal bearing medium 502 may encompass a non-transitory computer readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be wirelessly conveyed by signal bearing medium 502, where signal bearing medium 502 is conveyed by a wireless communications medium 510 (e.g., a wireless communications medium conforming with the IEEE 802.11 standard). Computer program product 500 may be recorded on non-transitory computer readable medium 506 or another similar recordable medium 508.

Figure 6:
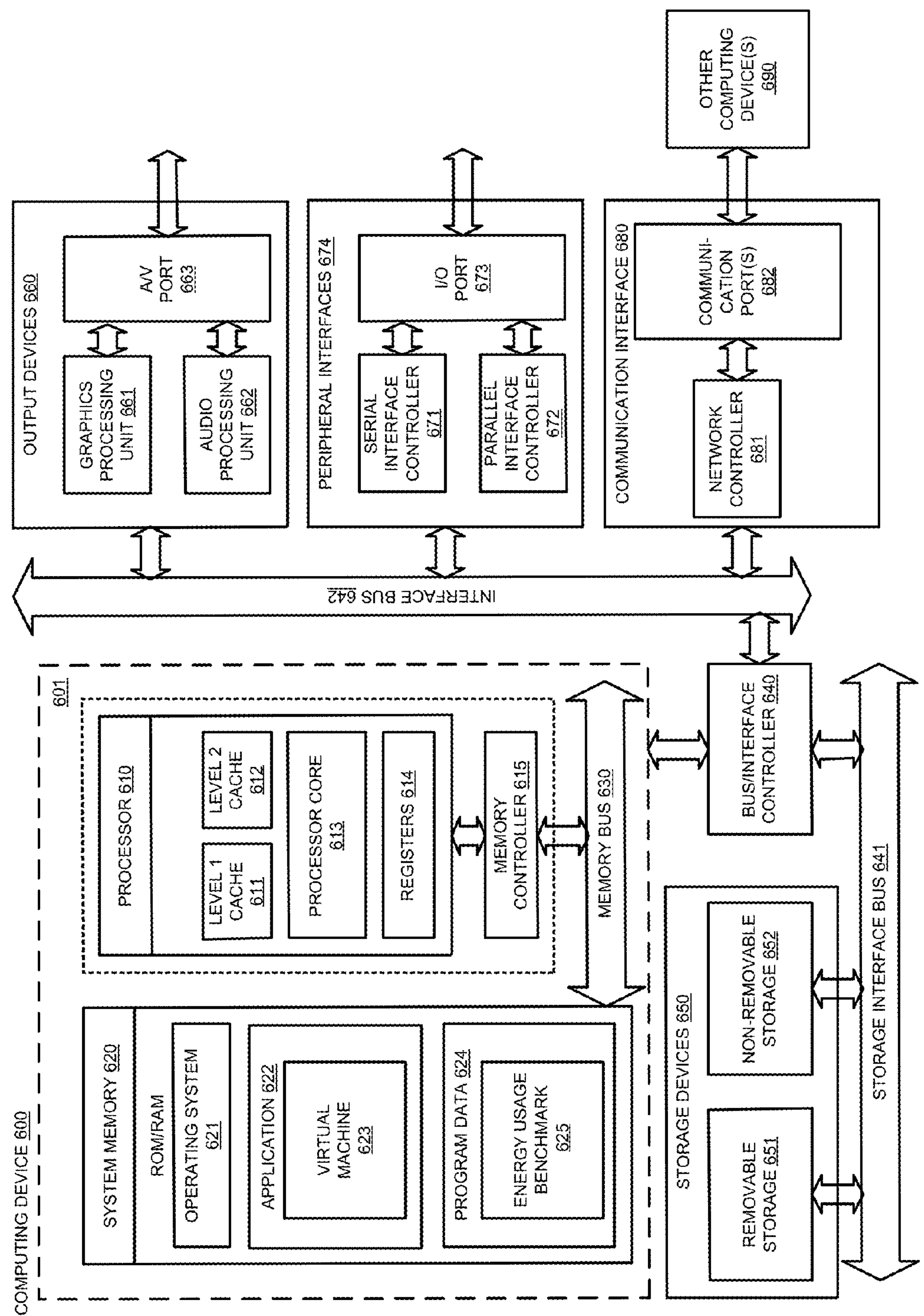
FIG. 6 shows a block diagram of an illustrative computer device, all arranged in accordance with at least some embodiments of the present disclosure.

FIG. 6 shows a block diagram of an illustrative embodiment of an example computing device 600 that is arranged as a computer system for use in one or more embodiments of the present disclosure. In a very basic configuration 601, computing device 600 may include one or more processors 610 and a main memory 620. A memory bus 630 may be used for communicating between processor 610 and main memory 620.

Depending on the desired configuration, processor 610 may be of any type including but not limited to a microprocessor (μP), a microcontroller (μC), a digital signal processor (DSP), or any combination thereof. Processor 610 can include one or more levels of caching, such as a level one cache 611 and a level two cache 612, one or more processor cores 613, and registers 614. Processor cores 613 can include an arithmetic logic unit (ALU), a floating point unit (FPU), a digital signal processing core (DSP Core), or any combination thereof. A memory controller 615 can also be used with processor 610, or in some implementations memory controller 615 can be an internal part of processor 610.

Depending on the desired configuration, main memory 620 may be of any type including but not limited to volatile memory (such as RAM), non-volatile memory (such as ROM, flash memory) or any combination thereof. Main memory 620 may include an operating system 621, one or more applications 622, and program data 624. Application 622 may include a VMM 623 that is arranged to perform the functions and/or operations as described herein including various functional blocks and/or operations described with respect to method 301 of FIG. 3 and method 401 of FIG. 4. Program Data 624 may include energy usage benchmark 625 generated by VMM 623. In some example embodiments, application 622 may be arranged to operate with program data 624 on an operating system 621 such that implementations of energy consumption optimization may be provided as described herein. This described basic configuration is illustrated in FIG. 6 by those components within dashed line 601.

Computing device 600 may have additional features or functionality, and additional interfaces to facilitate communications between basic configuration 601 and any required devices and interfaces. For example, a bus/interface controller 640 may be used to facilitate communications between basic configuration 601 and one or more data storage devices 650 via a storage interface bus 641. Data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

Main memory 620, removable storage 651, and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces 660, peripheral interfaces 674, and communication interfaces 680) to basic configuration 601 via bus/interface controller 640. Example output interfaces 660 may include a graphics processing unit 661 and an audio processing unit 662, which may be configured to communicate to various external devices such as a display or speakers via one or more A/V ports 663. Example peripheral interfaces 660 may include a serial interface controller 671 or a parallel interface controller 672, which may be configured to communicate with external devices such as input devices (e.g., keyboard, mouse, pen, voice input device, touch input device) or other peripheral devices (e.g., printer, scanner) via one or more I/O ports 673. Example communication interfaces 680 may include a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory; and a transmission type medium such as a digital and/or an analog communication medium (e.g., a fiber optic cable, a waveguide, a wired communications link, a wireless communication link).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method to operate a computer system that includes a plurality of system components, comprising:

establishing an energy usage benchmark for a system component of the computer system by measuring performance levels and energy usages of the system component under a plurality of energy settings and a plurality of utilization rates of the system component;

determining a utilization rate of the system component based on at least execution of a first plurality of instructions on the computer system; and configuring the system component for execution of a second plurality of instructions on the computer system subsequent to the execution of the first plurality of instructions by selecting an energy setting from the plurality of energy settings for operation of the system component, wherein:

the energy setting is selected based on the energy usage benchmark and the determined utilization rate; and the system component is determined to meet a threshold performance level for the execution of the second plurality of instructions under the selected energy setting.

2. The method as recited in claim 1, wherein the establishing the energy usage benchmark for the system component of the computer system comprises:

setting the system component to operate in a specific energy setting selected from the plurality of energy settings;

selecting a benchmark program with a specific utilization rate of the system component selected from the plurality of utilization rates;

collecting a specific performance level and a specific energy usage value from the system component during execution of the benchmark program; and storing the specific energy setting, the specific utilization rate, the specific performance level, and the specific energy usage value in the energy usage benchmark.

3. The method as recited in claim 1, wherein the determined utilization rate is based on a percentage of instructions that primarily utilizes the system component during the execution of the first plurality of instructions.

4. The method as recited in claim 1, further comprising:

identifying the system component to be used during execution of a scheduled instruction;

selecting an energy-efficient system component from the system component and an other system component for consumption of less energy while meeting the threshold performance level in the execution of the scheduled instruction; and utilizing the energy-efficient system component for the operation during the execution of the scheduled instruction.

5. The method as recited in claim 1, further comprising:

predicting an other utilization rate for operation of an other system component for execution of scheduled instructions, the predicting being based on historical data in an other energy usage benchmark for the other system component or analysis of the scheduled instructions; and selecting an other energy setting from an other plurality of energy settings for the operation of the other system component based on the predicted other utilization rate and the other energy usage benchmark for the other system component.

6. The method as recited in claim 1, further comprising:

presenting separate virtual machines to run separate operating systems, comprising:

running the operating systems on separate central processing units each with its own main memory;

assigning the plurality of system components, including the system component, in the computer system to the operating systems; and repeating the establishing the energy usage benchmark, the determining the utilization rate, and the configuring the system component for each of the plurality of system components in the computer system.

7. The method as recited in claim 6, wherein the assigning the plurality of the system components comprises, for each central processing unit, assigning a group of the system components that are physically close to the central processing unit.

8. The method as recited in claim 1, further comprising:

evaluating the operation of the system component during the execution of the second plurality of instructions by measuring additional values of the performance levels and the energy usages of the system component under the selected energy setting and the determined utilization rate of the system component;

updating the energy usage benchmark based on the additional values of the performance levels and the energy usages, the selected energy setting, and the determined utilization rate of the system component;

determining an other utilization rate of the system component based on the execution of the second plurality of instructions on the computer system; and configuring the system component for execution of a third plurality of instructions subsequent to the execution of the second plurality of instructions on the computer system by selecting an other energy setting from the plurality of energy settings for the operation of the system component, wherein the other energy setting is selected based on the energy usage benchmark and the other utilization rate, and the system component is determined to meet the threshold performance level for the execution of the third plurality of instructions under the selected other energy setting.

9. The method as recited in claim 1, wherein the system component includes a central processing unit (CPU), a cache, a memory, a hard drive, a graphic card, or a network card.

10. A method to operate a computer system, comprising:

determining an instruction load on a central processing unit (CPU) of the computer system based on execution of instructions; and in response to the instruction load on the CPU exceeding a CPU load threshold:

determining a cache-miss rate of a cache that is utilized by the CPU during the execution of the instructions; and in response to the cache-miss rate being greater than a cache-miss rate threshold, lowering a clock rate of the CPU.

11. The method as recited in claim 10, further comprising:

in response to the instruction load on the CPU exceeding the CPU load threshold and the cache-miss rate being less than an other cache-miss rate threshold, increasing the clock rate of the CPU.

12. The method as recited in claim 11, further comprising:

in response to the instruction load on the CPU exceeding the CPU threshold and the cache-miss rate being within a cache-miss rate threshold range, maintaining the clock rate of the CPU.

13. An apparatus configured to operate a computer system that includes a plurality of system components, comprising:

a virtual machine monitor configured to:

establish an energy usage benchmark for a system component of the computer system by measurement of performance levels and energy usages of the system component under a plurality of energy settings and a plurality of utilization rates of the system component;

determine a utilization rate of the system component based on at least execution of a first plurality of instructions on the computer system; and for execution of a second plurality of instructions on the computer system subsequent to the execution of the first plurality of instructions, select an energy setting from the plurality of energy settings for operation of the system component, wherein:

the energy setting is selected based on the energy usage benchmark and the determined utilization rate; and under the selected energy setting, the system component is determined to meet a threshold performance level for the execution of the second plurality of instructions.

14. The apparatus as recited in claim 13, wherein the virtual machine monitor is further configured to:

identify the system component to be used in execution of a scheduled instruction;

select an energy-efficient system component from either the system component or an other system component for consumption of less energy while meeting the threshold performance level in the execution of the scheduled instruction; and utilize the energy-efficient system component for operation during the execution of the scheduled instruction.

15. The apparatus as recited in claim 13, wherein the virtual machine monitor is further configured to:

predict an other utilization rate for operation of an other system component for execution of scheduled instructions, the prediction being based on historical data in an other energy usage benchmark for the other system component or analysis of the scheduled instructions; and select an other energy setting from an other plurality of energy settings for the operation of the other system component based on the predicted other utilization rate and the other energy usage benchmark for the other system component.

16. The apparatus as recited in claim 13, wherein the virtual machine monitor is configured to:

present separate virtual machines to run separate operating systems;

run the operating systems on separate central processing units each with its own main memory;

assign the plurality of system components, including the system component, in the computer system to the operating systems; and repeat the establishment of the energy usage benchmark, the determination of the utilization rate, and the selection of the energy setting for each of the plurality of system components in the computer system.

17. The apparatus as recited in claim 16, wherein to assign the plurality of system components, the virtual machine monitor is configured to, for each central processing unit, assign a group of the system components that are physically close to the central processing unit.

18. The apparatus as recited in claim 13, wherein the virtual machine monitor is further configured to:

measure additional values of the performance levels and the energy usages of the system component under the selected energy setting and the determined utilization rate of the system component during the execution of the second plurality of instructions; and update the energy usage benchmark based on the additional values of the performance levels and the energy usages, the selected energy setting, and the determined utilization rate of the system component.

19. The apparatus as recited in claim 13, wherein the virtual machine monitor is further configured to:

determine an instruction load on a central processing unit (CPU) of the computer system based on execution of instructions; and in response to the instruction load on the CPU being in excess of a CPU load threshold:

determine a cache-miss rate of a cache that is utilized by the CPU during the execution of the instructions; and in response to the cache-miss rate being greater than a cache-miss rate threshold, lower a clock rate of the CPU.

20. The apparatus as recited in claim 19, wherein the virtual machine monitor is further configured to:

in response to the instruction load on the CPU being in excess of the CPU load threshold and the cache-miss rate being less than an other cache-miss rate threshold, increase the clock rate of the CPU; and in response to the instruction load on the CPU being in excess of the CPU load threshold and the cache-miss rate being within a cache-miss rate threshold range, maintain the clock rate of the CPU.

* * * * *

UNITED STATES PATENT AND TRADEMARK OFFICE

CERTIFICATE OF CORRECTION

PATENT NO. : 8,671,293 B2
APPLICATION NO. : 13/878238
DATED : March 11, 2014
INVENTOR(S) : Qi et al.

It is certified that error appears in the above-identified patent and that said Letters Patent is hereby corrected as shown below:

In the Specification:

In Column 6, Line 43, delete “and 213,” and insert -- and 214, --, therefor.

In Column 8, Line 61, delete “320” and insert -- 320. --, therefor.

In Column 9, Line 35, delete “Block 320 may be followed by block 330” and insert -- Block 320 may be followed by block 330. --, at line 34, after “optimization.”.

In Column 9, Line 48, delete “340” and insert -- 340. --, therefor.

Signed and Sealed this
Twenty-second Day of July, 2014

Michelle K. Lee
*Deputy Director of the United States Patent and Trademark Office*